April 27, 1926.
G. H. PEGRAM
CARD INDEX
Filed Sept. 15, 1923   3 Sheets-Sheet 1
1,582,535
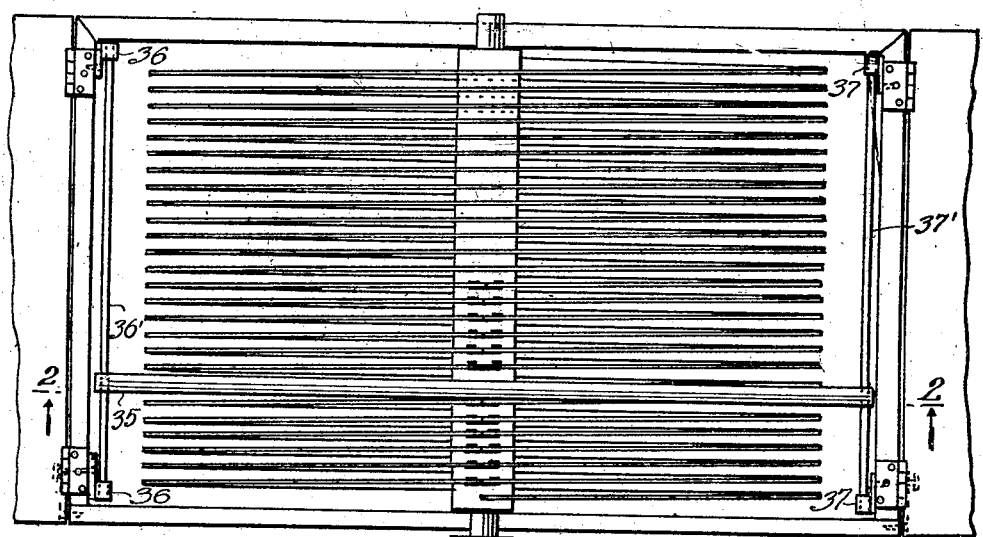
Fig. 1.
Fig. 4.
Fig. 5.
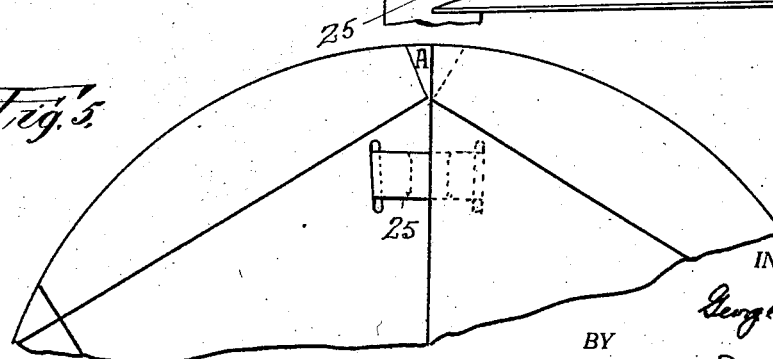
INVENTOR
George H. Pegram
BY
Darby & Darby
his ATTORNEYS April 27, 1926.
G. H. PEGRAM
CARD INDEX
Filed Sept. 15, 1923  3 Sheets-Sheet 2
1,582,535
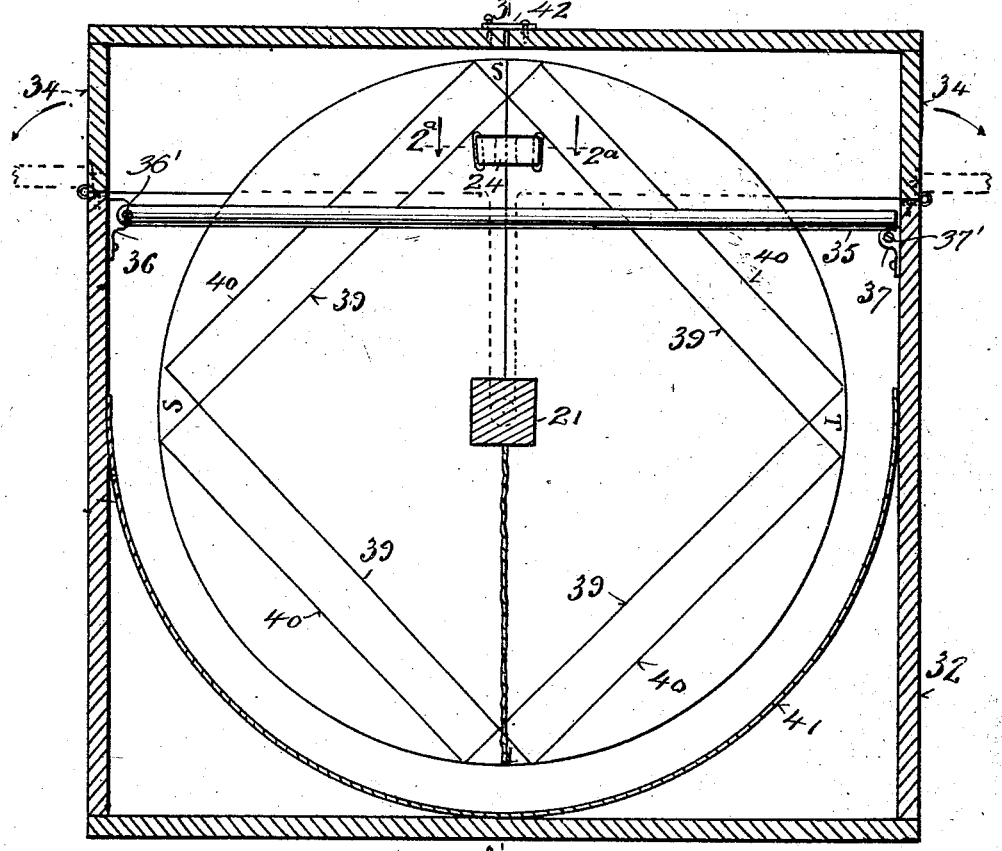
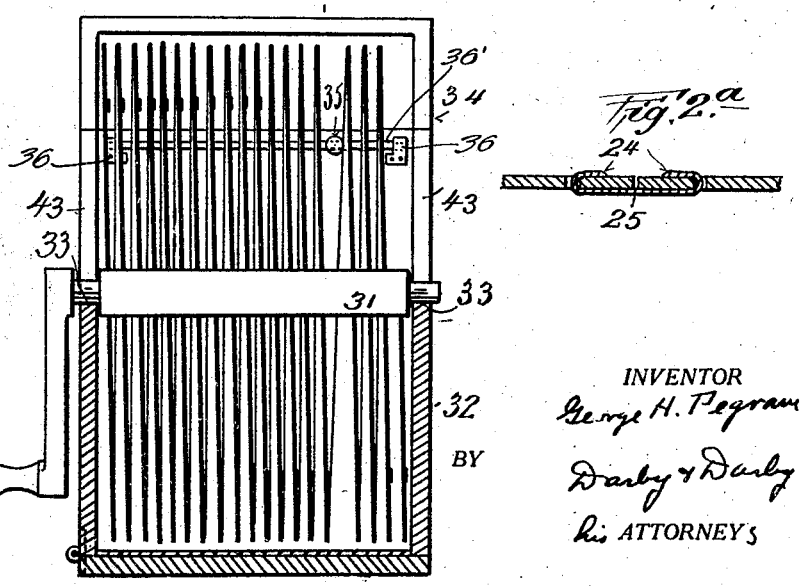
INVENTOR
George H. Pegram
BY
Darby & Darby
his ATTORNEYS April 27, 1926.
G. H. PEGRAM
1,582,535
CARD INDEX
Filed Sept. 15, 1923    3 Sheets-Sheet 3
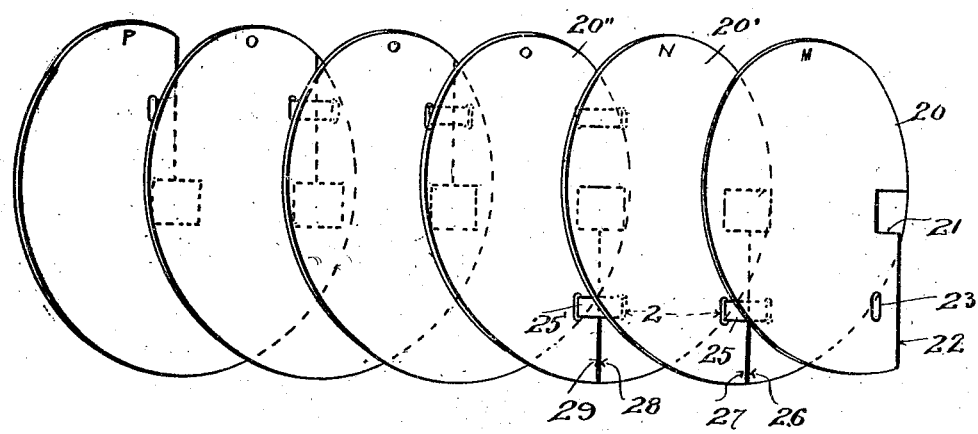
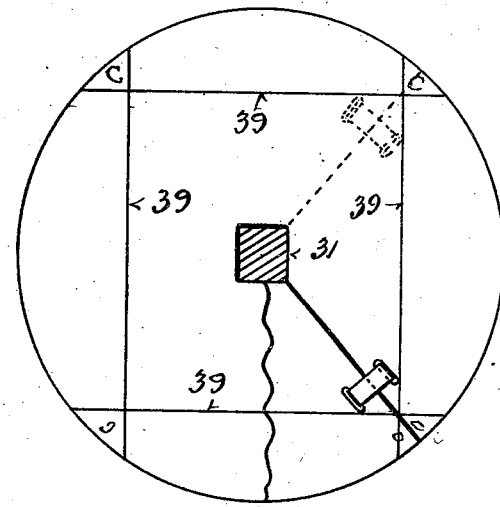
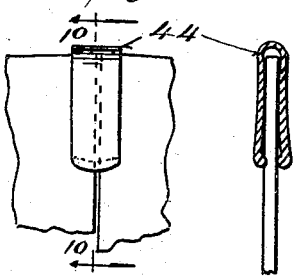
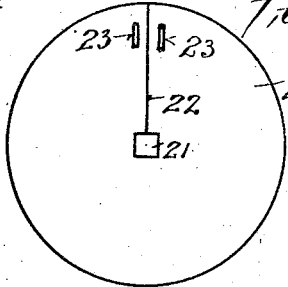
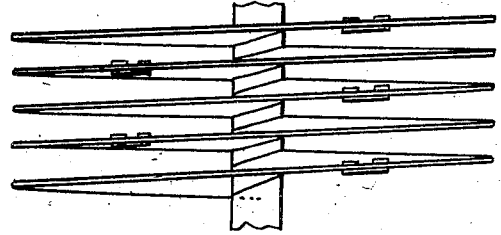
INVENTOR
George H. Pegram
BY
Darby & Darby
his ATTORNEYS Patented Apr. 27, 1926.

1,582,535

UNITED STATES PATENT OFFICE.

GEORGE H. PEGRAM, OF SOUTH ORANGE, NEW JERSEY.

CARD INDEX.

Application filed September 15, 1923. Serial No. 662,839.

*To all whom it may concern:*

Be it known that I, GEORGE H. PEGRAM, a citizen of the United States, residing at South Orange, in the county of Essex, State of New Jersey, have made a certain new and useful Invention in a Card Index, of which the following is a specification.

This invention relates to a card index system in the form of a continuous spiral, and has for its object the provision of an expansible and continuous spiral index wherein certain sections or card areas are designated for particular records and ready references.

It is a further object of my invention to provide a continuous rotatable card index which will admit of the removal or insertion of any card, or number of cards, in the spiral, and wherein the cards are so shaped and cut as to admit of ready mounting and quick assembling for additional cards. I also mount the spiral index in a suitable support and provide means for rotating the spiral so as to bring the different areas into view.

Other objects will appear hereinafter, and I attain these objects by the structure illustrated in the accompanying drawing, wherein—

Fig. 1 is a plan view of a construction embracing the principles of my invention.

Fig. 2 is a view taken on lines 2—2 of Fig. 1, looking in the direction of the arrows.

Fig. 2ª is a view on lines 2ª—2ª of Fig. 2, showing a clip uniting the edges of two adjacent cards in the spiral.

Fig. 3 is a view taken on lines 3—3 of Fig. 2.

Fig. 4 is a plan view of a portion of the spiral.

Fig. 5 is a view of a part of two adjacent cards showing a uniting clip.

Fig. 6 is a view of a portion of the spiral card system and showing one way of uniting the edges of successive cards.

Fig. 7 is an end view of a card spiral wherein a portion of a card has been removed to distribute the connecting edges of adjacent cards.

Fig. 8 is a plan view of the construction shown in Fig. 7.

Fig. 9 is a view of a modified form of clip employed to unite the respective edges of adjacent cards.

Fig. 10 is a view taken on lines 10—10 of Fig. 9; and

Fig. 11 is a plan view of a unit card.

Like numerals refer to similar parts throughout the several views.

It is a prime object of my invention to produce a ready reference in the form of a continuous spiral and which spiral may be composed of circular, or otherwise shaped, cards radially slit and having the respective edges connected to corresponding edges of adjacent cards on opposite sides, thereby connecting any number of cards into a continuous spiral. This spiral card index may be mounted in any convenient manner to be rotated in order to bring each card, or reference area, into view. Thus, any number of cards may be built up, as needed, and any suitable means may be employed for rotating the spiral, which is supported in any desired or suitable manner. The cards may be circular in shape, but this is not essential, as they may be square or other polygonal shape, as may be desired. Any suitable means may be employed for uniting the slit edges of adjacent cards to thereby form a continuous or spiral card index.

The unit of my spiral card system is a card 20, preferably circular, and having a central opening 21 for receiving a supporting or operating journal 31, which journal is supported in a container 32 by bearings 33. The journal and card opening may be square, as shown, or they may be otherwise shaped. From the card opening 21 there extends a radial slit 22, and on either side of the slit a uniting slot 23 may be provided for receiving the ends 24 of the holding clips 25. As is best shown in Fig. 6, one edge 26 of slit 22 in card (20) is united to its adjacent card edge 27 of card 20′ by clip 25. Similarly, edge 28 of card 20′ is united to edge 29 of card 20″ by clip 25′, and so on until a spiral of proper length, or capacity, has been built up. Obviously each card may be designated by an index letter, or several cards may be grouped for a common index letter, as conditions may require or necessity dictate, and as is clearly indicated by Fig. 6. It is also possible to remove any card by opening the holding clips, and if additional space is required any number of cards may be added at any point in the spiral by simply opening a clip 25, inserting the additional card and closing the respective holding clips.

In removing any unit member of the spiral, after the holding clips are removed which attach the ends of the unit member to the proximate ends of adjacent unit members, the unit member to be removed is then twisted laterally to enable the same to be removed from support 21, or else the support 21 is withdrawn from the spiral. This permits the detached unit member to be removed or replaced by one or more new units. The support 21, if it has been withdrawn, is then again inserted through the central openings in the spiral units and the device is again ready for use.

It will be observed that when the card is radially slit, as indicated by Fig. 11 for example, and these cards are then united in the manner described above, the holding clips will then all be in a common radial plane. To radially distribute the clips and points of union of the cards, I remove a sector from one or more cards, as illustrated for example by Fig. 7. In some instances I may insert half a card to bring the clips diametrically opposite, as illustrated in Fig. 6, and Figs. 7 and 8 illustrate the practice where a sector 44, for example, has been removed. I employ the above methods for radial distribution of the clips and unions to better balance the spiral and to prevent thickened area due to the position of the clips.

The spiral may be mounted to rotate in a suitable support or container 32, which may be provided with hinged covers 34. A spacer bar 35 is supplied to separate the cards for ready consultation. This bar is movably held on rod 36′ which rod is held by brackets 36. The other end of the spacer bar rests freely on bar 37′ which bar is held in brackets 37. These brackets are fastened on to the opposite walls of the container as is clearly shown in Figs. 1 and 2. Any suitable operating means, as a crank handle 38, may be used to rotate the spiral to thereby cause the spacer bar to expose different card areas to view. The data may be written or printed directly on the cards or it may be written or printed on paper which is pasted on the cards at the proper areas. For convenience, the cards may be laid off into suitable areas by segmental lines 39 or 40, as is best shown in Figs. 2 and 7. The spaces thus formed are available for permanent records and are readily brought in view by aid of the spacer bar. The index letters are preferably placed at the intersection of the segmental lines on the cards and indicate the index card.

The container or cabinet may be provided with a bottom shield 41, which may conform to the shape of the spiral cards, and a lock 42 may be provided to fasten the covers. To facilitate the removal of the spiral index for additional cards or data, I provide the cabinet with slots 43 which are provided with bearings 33 in which the index system can be rotated.

In place of the laterally placed clips 25, 25′, etc., I may use edge clips 44. These are placed over the edges of adjacent cards, in the manner shown by Figs. 9 and 10, and caused to bite into the cards to thus unite the edges of adjacent cards and thereby forming a continuous spiral as in the case when the former clips are used.

The use or operation of my continuous spiral card system is readily understood and is very simple, but highly efficient. With the cabinet open and the spacer bar approximately in position to separate the cards, it is only necessary to give a few turns to the handle to bring the proper card into view. It is then held in view as long as the bar, or spiral, is permitted to remain stationary. When the spiral is rotated the bar slides along the brackets and permits the various cards or card sections to be brought quickly into view.

While I have described a specific embodiment of my invention, I do not thereby desire to be understood as having thus limited myself unduly, as various modifications falling wholly within the scope and spirit of my invention will no doubt present themselves to those versed in the art.

What I claim, therefore, as new and useful and desire to secure by Letters Patent is:

1. The combination, in a card index, of means to form a spiral card index system, means for bodily rotating said system, and means for exposing to view any selected card area in said system.

2. The combination, in a spiral card index system, of cards connected to form a spiral means for supporting said spiral, means for rotating said spiral, and movable means for exposing to view any area on said spiral index.

3. The combination, in a card index, of means for uniting individual cards to form a continuous spiral card system, means for mounting said spiral card system, and means for rotating said spiral.

4. A continuous spiral card structure comprising individual cards slit radially, means to removably unite the respective edges of said slits to the corresponding edges of adjacently placed cards similarly slit to form said continuous spiral card structure, and means to bodily rotate said spiral about a common axis.

5. A continuous spiral card structure comprising individual cards slit radially, means to removably unite the respective edges of said slits to the corresponding edges of adjacently placed cards similarly slit to form said continuous spiral card structure, means to rotate said spiral, and means to selectively expose consecutive card areas to view.

6. A continuous spiral card structure comprising individual cards slit radially, means for removably uniting the respective edges formed by said slit to opposing edges of adjacent cards similarly slit, and means to radially distribute the united edges.

7. A continuous spiral card structure comprising individual cards slit radially, means for removably uniting the respective edges formed by said slit to opposing edges of adjacent cards similarly slit, means to radially distribute the united edges, and means to rotate said spiral structure to bring any indexed area into view.

8. In a rotatable card system, a continuous spiral reference index, means for rotating said index, and a movable separator element for causing adjacent card surfaces to be bent apart.

9. In a rotatable card system, a continuous spiral reference index built up from flat cards radially slit to form radial edges and having said edges displaced without the original plane determined by the card, clips to unite said edges to edges of adjacent cards to form a continuous spiral, and means to rotate said spiral.

10. In a rotatable card system, a reference card index in the form of a continuous spiral, a common axial support for said index, index letter areas set off on said cards and record areas determined by chords on said cards.

In testimony whereof I have hereunto set my hand on this 12th day of September A. D., 1923.

GEORGE H. PEGRAM.